United States Patent Office 3,547,677
Patented Dec. 15, 1970

3,547,677
PYROLYTIC CARBON COATED SUPPORT AND PROCESS FOR ITS MANUFACTURE
Claude Gentilhomme, Colmar, Haut-Rhin, and Jacques Menault, Venissieux, Rhone, France, assignors to Crylor, Paris, France, a French body corporate
No Drawing. Filed June 9, 1967, Ser. No. 644,780
Claims priority, application France, June 17, 1966, 65,974
Int. Cl. C23c 9/06
U.S. Cl. 117—46               13 Claims

ABSTRACT OF THE DISCLOSURE

Coated elements are produced by forming a film of a polymer based on acrylonitrile. which contains a metal salt, on a metal substrate and then pyrolysing the film.

---

This invention relates to coated elements which can be used especially for heat transfer by radiation in heating or heat treatment equipment, and have properties close to those of a black body, and to their manufacture.

By definition, a black body is a body which completely absorbs all radiation. The ratio of the energy brightness of a body receiving incident radiation to the energy brightness of a black body at the same temperature and receiving the same incident radiation is called the "total absorbtion factor" of a body.

The "total emission factor" of a radiation source is, equally, defined as the ratio of the total energy brightness of the source to that of a black body at the same temperature. It follows that a black body has a maximum total absorption factor and also a maximum total emission factor equal to unity.

The total emission factor of a surface at a temperature T is equal to the total absorption factor which this surface has for incident radiation coming from a black body heated to the same temperature.

In practice only "grey bodies" can be produced, that is to say bodies having a total absorption factor, and hence a total emission factor, which is less than unity.

In industry it is frequently necessary to heat an element in other ways than by contact with a heating element, especially when moving elements are to be heated. In this case resort is often made to heat transmission by radiation. However the metals which are known for their good thermal conductivity, and which are used for this reason as heating elements, have a relatively low total emission factor at the treatment temperatures, all the more so if their surface is polished; as a result these metals do not as such lend themselves to heat transfer by radiation. In order to make them usable it has been proposed to blacken them by forming a layer of an intrinsically black varnish on their surface. The supports which have been coated in this way have a surface with good emission properties, but their use is limited because the adhesion of the varnish coat to the support is inadequate for many purposes; under the influence of heat this coat is rapidly detached and this makes it necessary to change the heating elements frequently, for cleaning and recoating. All these operations increase the cost of the thermal treatment, particularly when this treatment is continuous.

It is furthermore known to pyrolyse acrylonitrile homopolymers without prior treatment, in order to reduce their inflammability. It has also been proposed to pyrolyse, under certain conditions, articles made of polymers based on acrylonitrile which have previously been treated in a bath containing cuprous ions to give products having improved flame-resistance.

In this specification the term "polymers based on acrylonitrile" denotes acrylonitrile homopolymers. and also copolymers, graft copolymers and mixtures of polymers containing at least 85% by weight of acrylonitrile and up to 15% of one or more ethylenic non-halogenated compounds copolymerisable with acrylonitrile.

In one aspect the invention consists in elements comprising a metal support having a coating formed by the pyrolysis of a polymer based on acrylonitrile (as defined above) which contains a metal salt.

According to another aspect of the invention, such an element is made by depositing a layer of a mixed solution of the polymer and the salt in a common solvent on the surface of the support eliminating the solvent and pyrolysing the resulting film.

The support as such may consist of a pure metal or a metal alloy, and preferably has good thermal conductivity. For example, various types of steel, or copper and its alloys, may be used.

The surface form of the support obviously depends on the form of the element which it constitutes or of which it forms a part. It will most frequently be plane or cylindrical, but may be more complex. Its surface may be polished, but is advantageously roughened by an appropriate abrasive treatment.

While the polymers based on acrylonitrile as defined above are generally suitable for use in accordance with the invention, the use of acrylonitrile homopolymer is preferred.

The metal components of the salts contained in the polymer are generally divalent and capable of forming co-ordination complexes, copper, nickel, cobalt and cadmium being preferred. The maximum proportion by weight of metal relative to the polymer is limited by the solubility of the salt in the solvent used for the polymer, and also depends on the method by which the polymer solution is applied to the metallic support. It has been found that excellent results can be obtained with metal ion contents above 2%.

The coatings of the invention have two important properties:

Firstly, they have absorption and emission properties close to those of a black body, thus total emission factors equal to or above 0.90 can be obtained.

Secondly, they differ from known black coatings by their exceptional adhesion to the metal support, which provides remarkable durability, which is particularly appreciated for industrial applications.

To produce a coated support in accordance with the invention, a coating composition may first be prepared by dissolving the metal salt. in the largest possible amount, preferably above 2% by weight (of metal ion) relative to the polymer, in a volatile solvent for the polymer, and then dissolving the polymer in this solution. Examples of volatile solvents which may be used include dimethylformamide, dimethylacetamide, dimethylsulphoxide, ethylene carbonate and γ-butyrolactone.

The surface of the metal support to which the coating is to be applied is advantageously first treated with an abrasive agent, for example sand, as this further improves the adhesion of the coating.

The coating composition is then applied to the surface of the support by methods which are in themselves known in the paint and varnish industry. For small surfaces it may be applied by means of a brush. For larger surfaces and/or for mass-production it is preferable to spray the solution from a gun. Preferably the support is at a temperature at which the solvent, or decomposition products thereof, evaporate very rapidly. This evaporation can be further accelerated by passing a stream of hot gas, for example air, close to the support.

The coating is thereafter subjected to a strong thermal pyrolysis treatment. For example the coated support may be heated in a ventilated or unventilated oven at a temperature between 150 and 400° C., preferably between 200 and 250° C. for at least 10 hours and preferably for at least 12 hours, so that the coating becomes entirely black. In this way a coating having a total emission factor of at least 0.90, and a thickness which depends on the concentration of the coating composition and on its method of application can be obtained.

If a thicker coating is required, one or more further layers of the coating composition may be applied and pyrolysed in the manner described. In this way coatings of thickness up to 50 microns may be obtained.

The coated supports obtained in accordance with the invention provide an efficient and simple solution whenever there is a problem of heat transmission by radiation, particularly when a moving element is heated by means of a fixed heat source. They may be used as the external (radiating) part of the heating element, which then has excellent emission properties, or as the external part (radiation receiver) of the element to be heated, which then has remarkable absorbent properties. Heat transmitted in this way may serve for heating or for the thermal treatment of solid or liquid materials or gaseous atmospheres. For example, the coated supports according to the invention can be applied in making heating rollers such as are described in U.S. Pat. No. 3,414,711 for use in the thermal treatment of textile articles such as filaments and fabrics, such rollers comprising a rotatable metal cylinder heated by radiation from at least one fixed heating element, preferably a moulded metallic electrical resistance, within the cylinder, the internal surface of the cylinder having a total absorption factor not less than 0.9 and the external surface of the heating element having a total emission factor near to that of a black body. The coated supports of the invention may provide the inner surface of the cylinder and the outer surface of the heating element.

One of the principal advantages of the coated supports of the invention is their exceptional durability, which allows them to be used for a very long time and affords considerable economy in calorific energy. In this respect they represent an important advance over the same supports covered with hitherto known black coatings. By way of comparison, heating elements used in the continuous treatment of thermoplastic filaments, when coated with the known coatings, become unusuable after a few weeks, whilst the same elements coated in accordance with the invention have served for more than a year without undergoing any change.

To determine the total emission power of a surface it is heated to a given temperature, and the surface temperature T is measured by known means, e.g. a thermocouple or resistance probe. The radiation temperature $T_r$ of the surface heated to temperature T is defined as being the temperature of a black body having the same energy brightness. This temperature $T_r$ is measured optically by means of a device consisting of a lens of a material which is transparent to infra-red radiation such as arsenic trisulphide, magnesium fluoride or calcium fluoride, and an infra-red detector located at its focus. This detector may be a bolometer, a thermopile, a Golay cell or any other known means. The apparatus is calibrated by means of a black body which is successively heated to various temperatures. By these means the total absorption coefficient of the surface is deduced from the Stephan law:

$$\alpha_T = T_r^4 / T^4$$

which equals the total emission factor of the surface in question.

The following examples illustrate the invention.

EXAMPLE 1

2 g. of hydrated copper sulphate ($CuSO_4 \cdot 5H_2O$) are dissolved in 83 g. of dimethylformamide at 25° C. 15 g. of an acrylonitrile homopolymer of specific viscosity 0.3, measured in a 2 g./l. solution of the polymer in dimethylformamide at 20° C., are added to this solution. After dissolving at 70° C., a homogeneous and limpid solution is obtained, with which the surface of a mild steel plate whose total absorption factor measured at 200° C. is 0.35 is coated by means of a brush. The applied coat is dried at 50° C. for 2 hours. The plate is then heated to 240° C. for 15 hours in air.

The emission factor of the coated plate at 200° C. is 0.92. It is furthermore found that the film (which is 30 microns thick), adheres very well and has good resistance to rubbing and to impact. To confirm its high temperature resistance, the coated plate is heated to 500° C. for 12 hours and then cooled for examination of the coating. The coating preserves all its properties, and the emission factor measured at 200° C. is 0.94.

EXAMPLE 2

A copper plate of total absorption factor 0.02 is coated with the solution described in Example 1. After drying at 70° C. and a thermal pyrolysis treatment for 12 hours at 230° C., the total absorption factor is found to be 0.95. The adhesion of the coating to the metal plate is found to be excellent.

EXAMPLE 3

A polished steel plate, to which adhesion is more difficult to achieve, is coated with a solution containing 18% by weight of acrylonitrile homopolymer in dimethylformamide containing 2.02% by weight of hydrated cobalt chloride $CoCl_2 \cdot 6H_2O$. After drying at 50° C. and pyrolysis for 15 hours at 240° C., a coating which has a total emission factor of the same order as in the preceding examples and adheres well to the polished steel is obtained.

EXAMPLE 4

The same results as in Example 3 are obtained if the hydrated cobalt salt in the coating composition is replaced by the same weight of anhydrous nickel chloride $NiCl_2$.

EXAMPLE 5

Similar results to those of Example 3 are obtained by replacing the cobalt salt by 1.02% by weight, relative to the polymer solution, of cadmium chloride $CdCl_2$.

EXAMPLE 6

A series of hollow steel cylinders are coated. The internal surface of the cylinders is sanded and then cleaned with trichlorethylene. The cylinders are preheated to 60–70° C., placed with their axis horizontal, and then rotated at a speed of 0.4 revolution per second. Their internal surface is then coated by means of a gun with the solution described in Example 1, taking care to ventilate them with a stream of hot air. When the coating is dry the rough edges are cleaned with dimethylformamide and the cylinders are then placed in an oven heated to 240° C. for 15 hours. The operations are repeated for a second layer. The total coating thickness is then 40 microns. The resulting cylinders are used as the rotating part of the drying rollers described in the copending application Ser. No. 535,973, now Pat. No. 3,414,711. Their working life without change is more than a year, though known black paints used under the same conditions do not last for more than three weeks.

We claim:

1. An element comprising a metal support having a coating of the pyrolysis product of a polymer selected from the group which consists of polyacrylonitrile and copolymers, including graft copolymers, and polymer mixtures containing at least 85% of units derived from acrylonitrile and up to 15% of units derived from an ethylenic, non-halogenated compound copolymerisable therewith, which polymer contains a metal salt and is soluble in a volatile solvent.

2. An element according to claim 1 wherein the metal salt is a salt of a divalent metal which is capable of forming co-ordination complexes.

3. An element according to claim 2 wherein the salt is a copper, nickel, cobalt or cadmium salt.

4. An element according to claim 3 wherein the polymer is acrylonitrile homopolymer.

5. An element according to claim 1 wherein the coating has a total emission factor of at least 0.90.

6. An element according to claim 4 wherein the coating has a total emission factor of at least 0.90.

7. A process for the manufacture of an element capable of radiating and absorbing heat, which comprises depositing on the surface of a metal support a layer of a solution of a polymer selected from the group which consists of polyacrylonitrile and copolymers, including graft copolymers, and polymer mixtures containing at least 85% of units derived from acrylonitrile and up to 15% of units derived from an ethylenic, non-halogenated compound copolymerisable therewith, which polymer contains a metal salt, in a common solvent for the polymer and the salt, eliminating the solvent, and pyrolysing the resulting film.

8. A process according to claim 7 wherein the pyrolysis is carried out by heating the coated support at a temperature between 150 and 400° C. for more than 10 hours.

9. A process according to claim 8 wherein the coated support is heated to a temperature between 200 and 250° C. for more than 12 hours.

10. A process according to claim 7 wherein the film-forming and pyrolysis operations are repeated one or more times.

11. A process according to claim 7 wherein the metal salt is a salt of copper, nickel, cobalt or cadmium.

12. A process according to claim 11 wherein the polymer is acrylonitrile homopolymer.

13. A heating roller suitable for the thermal treatment of textile materials, said roller comprising a rotatably mounted hollow metal cylinder and fixed within the space inside said cylinder, at least one radiant heating element comprising a moulded metallic electrical resistance, the internal surface of the cylinder having a high heat-absorption factor and the external surface of the heating element having a high heat-emission factor, and at least one of said surfaces being that of an element according to claim 12.

References Cited
UNITED STATES PATENTS

| | | | |
|---|---|---|---|
| 2,697,028 | 12/1954 | Baker et al. | 117—46(CB) |
| 2,809,901 | 10/1957 | Bach | 117—46(CB) |
| 3,395,970 | 8/1968 | Machell | 117—46(CC) |

ALFRED L. LEAVITT, Primary Examiner

J. A. BELL, Assistant Examiner

U.S. Cl. X.R.

117—226; 23—209.4; 264—29